US012562618B2

(12) United States Patent
Wilson-Jones et al.

(10) Patent No.: US 12,562,618 B2
(45) Date of Patent: Feb. 24, 2026

(54) DUAL MOTOR DRIVE ASSEMBLY

(71) Applicant: ZF Automotive UK Limited, Solihull (GB)

(72) Inventors: Russell Wilson-Jones, Stratford upon Avon (GB); Christos Prevezianos, Birmingham (GB); Ari Akbar Hassan Al-Jaf, Birmingham (GB)

(73) Assignee: ZF Automotive UK Limited, Solihull (GB)

( * ) Notice: Subject to any disclaimer, the term of this patent is extended or adjusted under 35 U.S.C. 154(b) by 232 days.

(21) Appl. No.: 18/363,248

(22) Filed: Aug. 1, 2023

(65) Prior Publication Data

US 2024/0055942 A1     Feb. 15, 2024

(30) Foreign Application Priority Data

Aug. 9, 2022    (GB) ...................................... 2211647

(51) Int. Cl.
*H02K 7/11* (2006.01)
*H02K 7/00* (2006.01)
*H02K 7/118* (2006.01)

(52) U.S. Cl.
CPC ............. *H02K 7/118* (2013.01); *H02K 7/003* (2013.01)

(58) Field of Classification Search
CPC .... H02K 16/00; H02K 2213/06; H02K 29/03; H02K 7/003; H02K 7/116; H02K 7/118
See application file for complete search history.

(56) References Cited

U.S. PATENT DOCUMENTS

| | | | | |
|---|---|---|---|---|
| 10,526,004 B2 * | 1/2020 | Witte | ................... | B62D 5/0421 |
| 11,440,580 B2 * | 9/2022 | Kim | ..................... | B62D 5/0409 |
| 2004/0000829 A1 * | 1/2004 | McVicar | ............... | H02K 7/116 |
| | | | | 310/75 R |
| 2004/0007416 A1 * | 1/2004 | Furumi | .................. | B62D 5/046 |
| | | | | 180/443 |
| 2015/0298722 A1 * | 10/2015 | Witte | ................... | B62D 5/0421 |
| | | | | 180/407 |
| 2020/0153367 A1 | 5/2020 | Abraham | | |
| 2021/0044192 A1 | 2/2021 | Galehr | | |

FOREIGN PATENT DOCUMENTS

| | | |
|---|---|---|
| EP | 0696029 A2 | 2/1996 |
| JP | H06344927 A | 12/1994 |

* cited by examiner

*Primary Examiner* — Naishadh N Desai
(74) *Attorney, Agent, or Firm* — Kristin L. Murphy

(57)     ABSTRACT

A dual motor drive assembly comprises a housing, a shaft rotatably mounted with respect to the housing, a first gear connected to and configured to rotate with the shaft, and first and second motors, each having an output driving a respective output gear, the output gears being engaged with the first gear, in which each motor comprises a permanent magnet motor that has the same number of poles and stators such that each motor produces the same pattern of cogging torque over a complete mechanical revolution of the motor.

15 Claims, 10 Drawing Sheets

DUAL MOTOR DRIVE ASSEMBLY

CROSS-REFERENCE TO RELATED APPLICATION

This application claims priority to GB Priority Application No. 2211647.9, filed Aug. 9, 2022, the disclosure of which is incorporated herein by reference in its entirety.

TECHNICAL FIELD

This disclosure relates to a dual motor drive assembly, in particular but not exclusively suitable for use in a handwheel actuator assembly of a vehicle.

BACKGROUND

Electric motors are widely used and are increasingly common in automotive applications. For example, it is known to provide an electrically power assisted steering system in which an electric motor apparatus applies an assistance torque to a part of a steering system to make it easier for the driver to turn the wheels of the vehicle. The magnitude of the assistance torque is determined according to a control algorithm which receives as an input one or more parameters such as the torque applied to the steering column by the driver turning the wheel, the vehicle speed and so on.

Another example of use of electric motors in automotive applications in in steer-by-wire systems. During normal use, these systems have no direct mechanical link from the hand wheel that the driver grips and the steered wheels with movement of the hand wheel by the driver being detected by a sensor and the motor being driven in response to the output of the sensor to generate a force that steers the road wheels. These systems rely on sensors to relay user input data at a steering wheel to control units which integrate user input data with other information such as vehicle speed and yaw rate, to deliver control signals to a primary motor that physically actuates a steering rack of the vehicle. The control units also act to filter out unwanted feedback from the front wheels and provide a response signal to a secondary electric motor at the steering wheel. The secondary motor provides the driver with the appropriate resistance and feedback in response to specific user inputs at the steering wheel to mimic the feel of a conventional steering system.

In a steer-by-wire system, a malfunction or failure of a portion of the second assembly may result in an inability to steer the vehicle. As a result, it is desirable to provide the second assembly with structure for providing at least temporary fail-safe operation. US 2006/0042858 A1 discloses steering apparatus including a steering assembly that includes a handwheel actuator. The handwheel actuator includes a steering shaft for supporting a steering wheel, a gear mechanism and two motors, each for providing a torque to the steering shaft.

SUMMARY

GB 2579374 A discloses a steering column assembly for use with a steer-by-wire hand wheel actuator. This assembly utilises a similar dual motor drive system that comprises first and second motors, each having an output driving a respective output gear. Each output gear drives a first gear which is connected to and configured to rotate a shaft of the steering wheel to provide a sensation of road feel to the driver. The dual motor drive system is used to reduce gear rattle by driving both motors at the same time to apply opposing torques to the steering shaft. Having two motors also provides for some redundancy in the system.

Typically, these applications utilise Permanent Magnet Synchronous Motors (PMSMs) due to their impressive torque density and dynamic response times. PMSMs are conventionally designed with a slotted stator defining a set of teeth due to cost and packaging constraints, with a rotor including magnetically hard material which acts as a set of permanent magnets. The permanent magnets may therefore form part of the rotor, and the stator comprises magnetically soft material surrounded by coils of wire, but the reverse configuration is also possible.

One significant problem for this type of motor is torque ripple. Torque ripple describes periodic variance of output torque of a motor as the rotor rotates Another problem with this type of motor is cogging torque which can make a significant contribution to torque ripple. Cogging torque arises due to the fluctuating interaction between hard and soft magnetic materials during each cycle of the motor. This fluctuating interaction is a result of variation in the air gap between the rotor and stator, associated with the slotted structure of the stator.

Cogging torque leads to undesirable fluctuations in output torque and as this effect depends only on relative movement of the rotor and stator, it can cause issues for movement of both powered and unpowered motors. Cogging torque is more observable in steer-by-wire hand wheel actuators where the low speeds of revolution mean the motor's moment of inertia is unable to level out torque fluctuations.

One way to mitigate the effect of cogging torque within a single motor is to select the stator slot or number of permanent magnet poles such that the number of stator slots divided by the number of rotor poles is a non-integer number. This ensures that a fraction of the slots to not line up with the magnet edges, which reduces cogging torque. Whilst this method significantly reduces cogging torque it comes at the expense of reduced torque capability for a given current.

Another method for reducing cogging torque and by extension torque ripple of a single motor, is to skew the rotor with respect to the stator, or conversely the stator with respect to the rotor. The transitions between the stator slots and the permanent magnet edges are therefore not parallel, which results in smoother transitions during rotation.

Torque ripple is frequently analysed and expressed as a Fourier series. The skew angle is frequently selected to cancel the dominant cogging torque harmonic. For a motor without manufacturing defects this is typically the cogging torque resulting from the lowest common multiple of magnetic poles of the rotor and the number of stator teeth. For example, a motor having 8 rotor poles and 12 stator teeth and will have a variation in cogging torque 24 times per revolution of the rotor. Selecting a skew angle of 15 degrees (360/24) will smooth out the fundamental variation in torque resulting from the combination of rotor poles and stator slots. However, whilst significantly reducing the cogging torque and therefore torque ripple this approach reduces the capability of the motor. Taking this approach also only addresses torque ripple arising the from combination of poles and slots within the motor, and not that resulting from the currents present when the motor is energized.

The present disclosure seeks to ameliorate the problems associated with conventional motor assemblies whilst enabling a range of different motor topologies to be used both with and without skewing.

In accordance with the present disclosure, a dual motor drive assembly comprises a housing, a shaft rotatably mounted with respect to the housing, a first gear connected to and configured to rotate with the shaft, and first and second motors, each having an output driving a respective output gear, the output gears being engaged with the first gear, in which each motor comprises a permanent magnet motor that has the same number of poles and stators such that each motor produces the same pattern of cogging torque over a complete mechanical revolution of the motor, and characterised in that the relative phasing of the first motor relative to that of the second motor is fixed whereby the effect of cogging torque applied to the shaft by the first motor is at least partially cancelled by the effect of cogging torque applied to the shaft by the second motor when the shaft is rotated.

By relative phasing of the two motors, we mean that for any position of the shaft the mechanical angle of the two motors is not the same. For example, the stators may be offset relative to each other by a non-zero number of degrees mechanical, or the rotors are offset from each other by a non-zero number of degrees, or both the rotor and the stators are offset from each other by a non-zero number of degrees. Thus, with a first one of the motors positioned at zero degrees mechanical the second rotor will be at a non-zero degrees mechanical position. Looked at another way, where the motors have a pattern of torque ripple and cogging torque that varies over the complete range of angles 0 to 360 degrees that the rotor can adopt relative to the stator the two motors may be phase aligned when the patterns are aligned, and to have a relative phase difference, a phase offset, when the patterns are misaligned. The amount by which the patterns are misaligned can be expressed as an angle in degrees or radians.

The assembly may include a common housing for both motors. The offset between the stators or rotors or both may be achieved by fixing the stators of the two motors into the housing with an appropriate orientation. The orientations of the two motors may be selected to provide a relative phase difference between the motors. In this way, each of the two motors may be substantially similar having the same angular relationship between each of the rotors and their respective output gears. As such, the two rotors may be connected to the shaft so that they have the same angular electrical position (i.e., as the first gear rotates in a first plane when a north pole of the first rotor is aligned in the first plane, a corresponding north pole of the second rotor is also aligned in the first plane.

The motors may be fixed to the housing such that the two stators are aligned with no relative phase difference and the rotors engage the gear wheel with a non-zero relative phase difference. In this way, each of the two motors have a different angular relationship between each of the rotors and their respective output gears.

The rotor and the stator of each of the two motors can be identical in topology. By this we mean they have the same number of rotor magnets or poles, and the same number of stator magnets or poles. This is beneficial in reducing the bill of materials for the assembly and simply the design of the control and drive circuits for the two motors.

The dual motor drive assembly may form part of a handwheel actuator assembly for a vehicle, where the shaft includes a fixing part whereby it can be fixed to a steering wheel or yoke.

The relative phasing between the motors may be chosen as a function of the motor topology during design of the dual motor assembly. The phase offset may be selected as function of the following motor parameters:

Number of rotor poles, i.e., the number of magnets in the motor;

Number of cycles of a certain waveform per one mechanical rotation;

The motor skew angle;

Where the motor is step skewed, the skew angle per step of the magnets.

In one arrangement of a motor having the permanent magnets mounted to the rotor the motor phase offset may be determined from the following equations:

$$N_{period} = N_p Q / HCF\{Q, Np\}$$

Where $N_p$ is the number of poles $Q$ is the number of the stator slots $N_{period}$ is the number of the repetitive cogging cycles in one mechanical cycle; and $\vartheta_{sk} = (2/Np)*(2\pi/Q)$ and $(\vartheta ss = \vartheta_{sk}/N_s)$ ($N_s$ can be referred as the number of stators or the motors sharing the same output)

where:

$\vartheta_{ss}$ is the skew angle per step, $N_s$ is number of rotor pucks or step skew, and $\vartheta_{sk}$ is the total skew for the whole rotor From the above equations it can be deduced that:

Mech. Deg. per cogging cycle=$360/N_{period}$

And from this it can be determined that the relative phase shift between the two motors=Mech. Deg. per cogging cycle/2

$**(\vartheta_{ss} = \vartheta_{sk}/N_s)$ ($N_s$ can be referred at as number of stator stators or the motors sharing the same output) and $(\vartheta_{ss}$ can be used as shift angle between the stators)

$**\vartheta_{sk} = (2/N_p)*(2\pi/Q)$

Where both motors comprise permanent magnet motors in which the rotor has six permanent magnets and the stator has 9 coil windings arranged typically as three sets of phases A, B and C, a so called 9:6 motor, the relative phase shift between the two motors may be set to 10 degrees mechanical per cogging cycle which is 20 degrees mechanical since:

$$N_{period} = N_p Q / HCF\{Q, Np\} = 9*6/3 = 18$$

Mech. Deg. per cogging cycle=$360/N_{period} = 360/18 = 20°$ Mech. Deg.

Stator Shift req.=Mech. Deg. per cogging cycle/2=20/2=10° Mech. Required $\vartheta_{sk} = \vartheta_{sk} = (2/N_p)*(2\pi/Q) = 2*360/(9*6) = 20°$ mech.

$\vartheta_{ss} = \vartheta_{sk}/N_s = 20°/2 = 10°$ Mech.

$\vartheta_{ss} =$ shift angle between the stators

Where the motor is a 12:8 motor with 12 stator windings arranged typically as four sets of phases A, B and C and the rotor has 8 permanent magnets the offset between the motors may be set at 7.5 degrees mechanical per cogging cycle which is 15 degrees mechanical since:

$$N_{period} = N_p Q / HCF\{Q, N_p\} = 12*8/4 = 24$$

Mech. Deg. per cogging cycle=$360/N_{period} = 360/24 = 15°$ Mech. Deg.

Stator Shift req.=Mech. Deg. per cogging cycle/2=15/2=7.5° Mech. required $\vartheta_{sk} = \vartheta_{sk} = (2/N_p)*(2\pi/Q) = 2*360/(12*8) = 15°$ mech.

$\vartheta_{ss} = \vartheta_{sk}/N_s = 15°/2 = 7.5°$ Mech.

$\vartheta_{ss} =$ shift angle between the stators

Where the motor is a 12:10 motor with 12 stator windings arranged typically as four sets of phases A, B and C and the rotor has 10 permanent magnets the offset between the motors may be set at 3 degrees mechanical per cogging cycle which is 6 degrees mechanical since:

$$N_{period} = N_p Q/HCF\{Q,N_p\} = 12*10/2 = 60 \; \square 60 \; \text{thmech.}$$
Order ripple Mech. Deg. per cogging cycle=$360/N_{period}$=360/60=6° Mech. Deg.

Stator Shift req.=Mech. Deg. per cogging cycle/2=6/2=39 Mech. required $\vartheta_{sk} = \vartheta_{sk} = (2/N_p)*(2\pi/Q) = 2*360/(12*10) = 6°$ mech.

$\vartheta_{ss} = \vartheta_{sk}/N_s = 6°/2 = 39$ Mech.

$\vartheta_{ss}$=shift angle between the stators

The above phase shifts provide a significant reduction in the overall cogging torque present at the output shaft because the cogging torque generated by each motor cancels out partially.

In addition to cogging torque, which is present when the shaft is rotated at a time that both motors are unpowered, the relative phase of the two motors may be set so as that the torque ripple that occurs as current flows through the motor windings applied to the shaft by the first motor is at least partially cancelled by the effect of the current flowing through the other motor.

It is known for a three-phase motor that the dominant component of the torque ripple is always $6^{th}$ order electrical and defined by the following expression:

Torque ripple order mech.=$6*N_p/2$

Mech. Deg. per $T_{ripplecycle}$=$360/N_{period}$

Stator Shift req.=Mech. Deg. per cogging cycle/2

By applying these equations the phase offset of the two motors to best cancel out the effect of the torque ripple is as follows:

Taking a 9:6 motor as an example:

Torque ripple order mech.=$6*6/2$=18

=$18^{th}$ order mech.

Mech. Deg. per $T_{ripplecycle}$=$360/T_{rippleorder}$ mech=360/18=20° Mech.

Stator Shift req.=Mech. Deg. per $T_{ripplecycle}$/2=20/2=10° Mech

Taking a 12:8 motor as an example:

Torque ripple order mech.=$6*8/2$=24

=$24^{th}$ order mech.

Mech. Deg. per $T_{ripplecycle}$=$360/T_{rippleorder}$ mech=360/24=15° Mech.

Stator Shift req.=Mech. Deg. per $T_{ripplecycle}$/2=15/2=7.5° Mech

Taking a 12:10 motor as an example:

Torque ripple order mech.=$6*10/2$=30

=$30^{th}$ order mech.

Mech. Deg. per $T_{ripplecycle}$=$360/T_{rippleorder}$ mech=360/30=12° Mech.

Stator Shift req.=Mech. Deg. per $T_{ripplecycle}$/2=12/2=6° Mech

The applicant has appreciated that for some motor topologies the optimum angles for cancelling cogging torque and for cancelling motor torque ripple are not the same. Nevertheless, the applicant has appreciated that it is possible to provide an optimised amount of cancellation of one or of the harmonics present due to cogging torque or torque ripple by an appropriate phase offset and the optimum will depend on which harmonic is the most troublesome for a given application of the dual motor drive assembly.

In the case of the 9:6 motor topology the optimum shift for reducing both cogging torque and the torque ripple due to motor currents Is 10 degrees. As such the provision of two motors of this arrangement with a 10-degree phase offset comprises an example implementation of the disclosure.

The applicant has also appreciated that the same benefit of the phase differences between the motors can be achieved at several different phase differences due to the periodic nature of the harmonics present due to the cogging torque and torque ripple.

Accordingly for a 9:6 motor, the phase difference between the motors can be set to 10 degrees plus M*20 degrees where M is an integer value or zero, i.e. a phase difference of 10, 30, 50, 70 . . . etc. degrees.

The phase difference may be chosen to optimise the cancellation of a particular harmonic, for example the $18^{th}$ order or $36^{th}$ order harmonics.

The first gear can comprise a worm gear and each of the output gears comprises a worm screw.

The rotational axes of the two worm screws can be inclined with respect to each other, and the rotational axes of the two worm screws can also extend perpendicularly to the rotational axes of the first gear.

This reduces the overall size of the assembly, which facilitates fitting it within a relatively limited volume within the vehicle.

The motors can be located within the housing.

In exemplary arrangement, the motors are substantially identical apart from their orientation. In addition, the output gears can be substantially identical so that the torque multiplication from the motors to the shaft are the same.

BRIEF DESCRIPTION OF DRAWINGS

By way of example only, a specific exemplary arrangement of the present disclosure incorporated into a handwheel actuator assembly for a vehicle will now be described with reference to the accompanying drawings, in which.

DETAILED DESCRIPTION

A steer-by-wire hand wheel actuator 1 comprises an external elongate metal housing 2 which encloses an elongate void. A shaft 3 to which a steering wheel (not shown) is connected passes through one end of the metal housing 2 and the end of the shaft is radially supported on bearings (not shown) located at one end of the housing 2.

Figure 2:
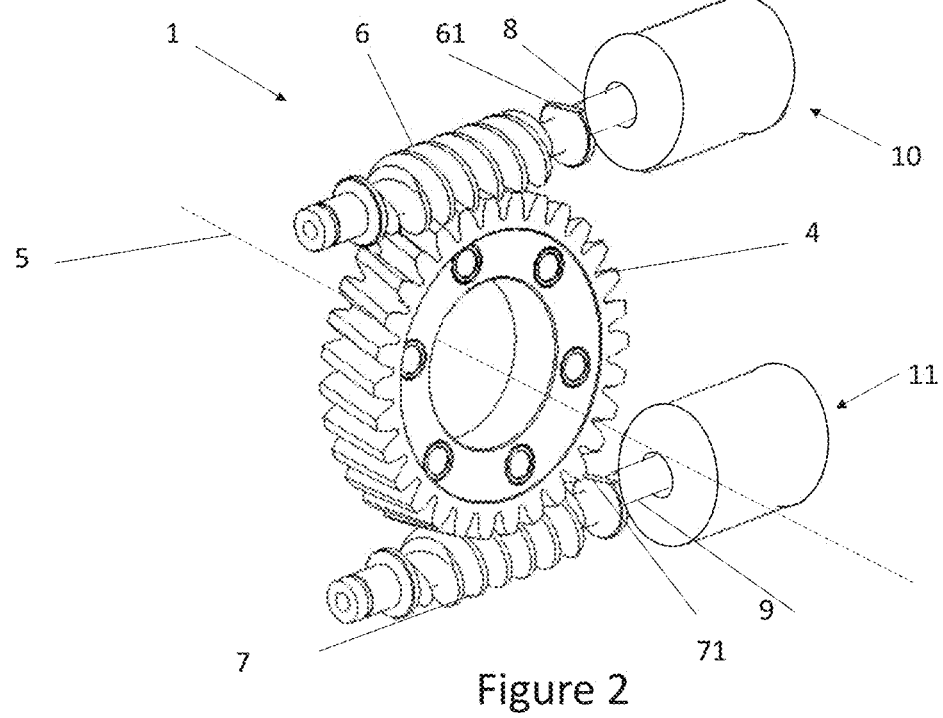
FIG. 2 shows a part of the dual motor drive apparatus with the gearbox housing removed to better show the gears and the motor connection to the gears.

As best seen in FIG. 2 a gear wheel 4 is secured to the end of the shaft 3 and rotates with the shaft 3. The shaft is not shown in FIG. 2 but the axis of rotation of the shaft is marked using a dashed line 5, extending perpendicularly through the gear wheel 4. The periphery of the gear wheel 4 is formed as a worm gear which meshes with each of two identical worm screws 6, 7 located on opposite sides of the longitudinal axis 5 of the shaft 3. Each worm screw 6, 7 is connected to the output shaft 8, 9 of a respective electric motor 10, 11. Each worm screw 6, 7 is provided with a respective indicator 61, 71 to mechanically align each rotor with the worm screw teeth. In this example, the indicators 61, 71 are flattened sections of joining faces of each of the worm screws 6, 7.

Figure 1:
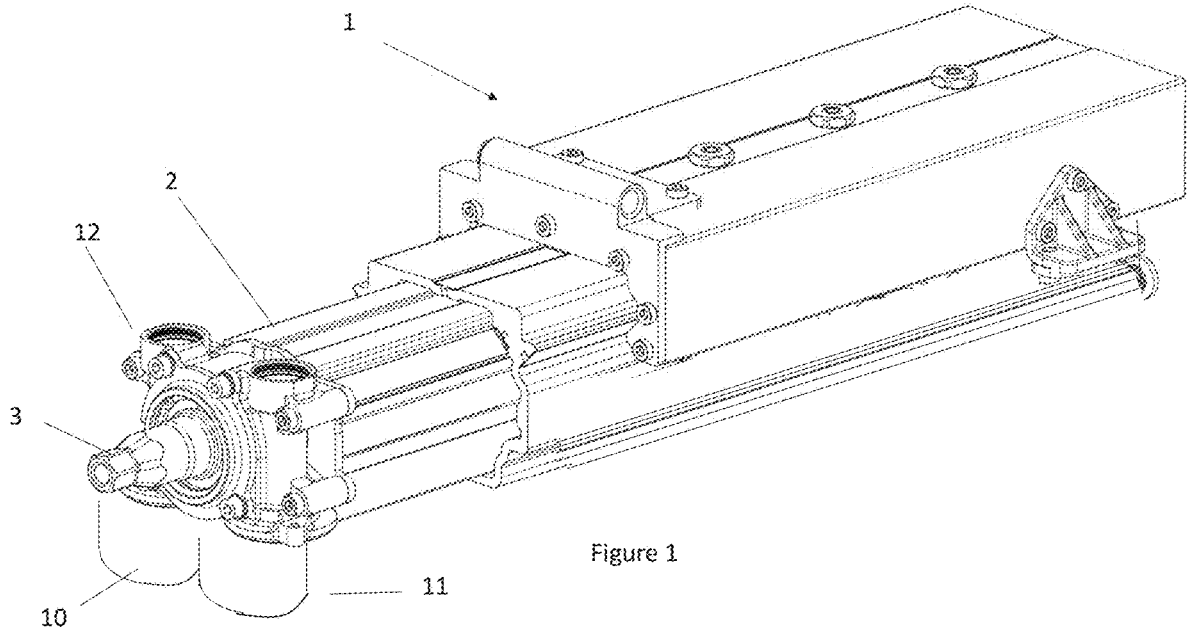
FIG. 1 shows a perspective view of an exemplary arrangement of a handwheel actuator assembly for a vehicle that includes a dual motor drive apparatus in accordance with the present disclosure.
Figure 4:
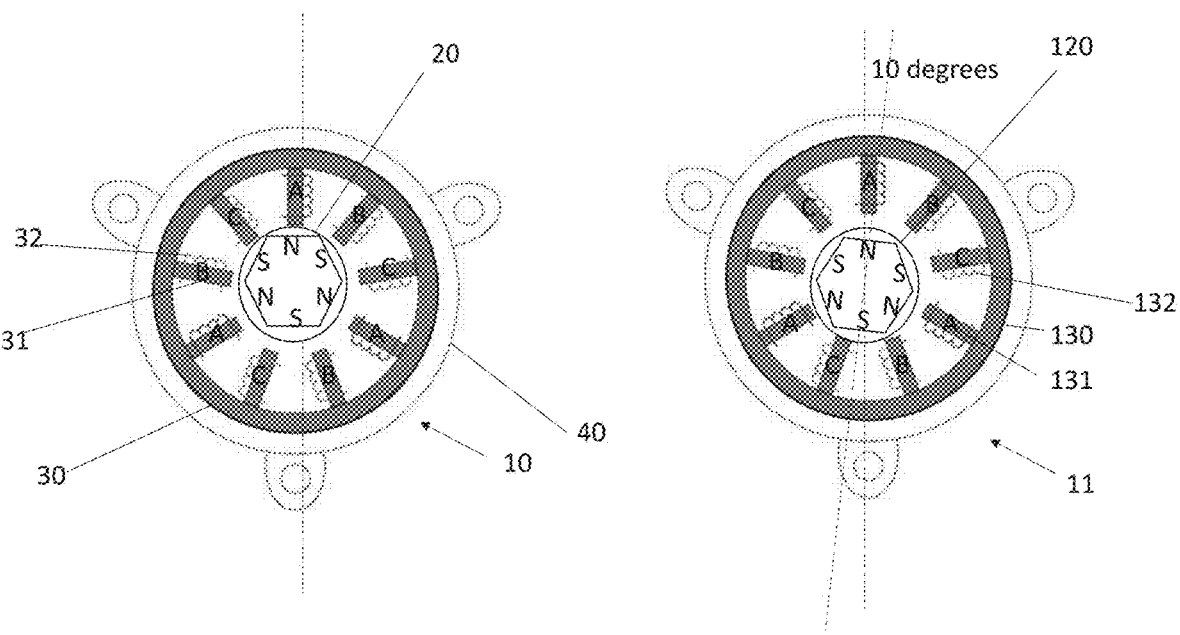
FIG. 4 is a cross section view of each of the two motors of the apparatus of FIG. 1 illustrating the location of the magnets, the stator teeth, and the electrical connections of the phase windings such there is a 10 degrees relative phasing between the motors due to offset of the two rotors.
Figure 5:
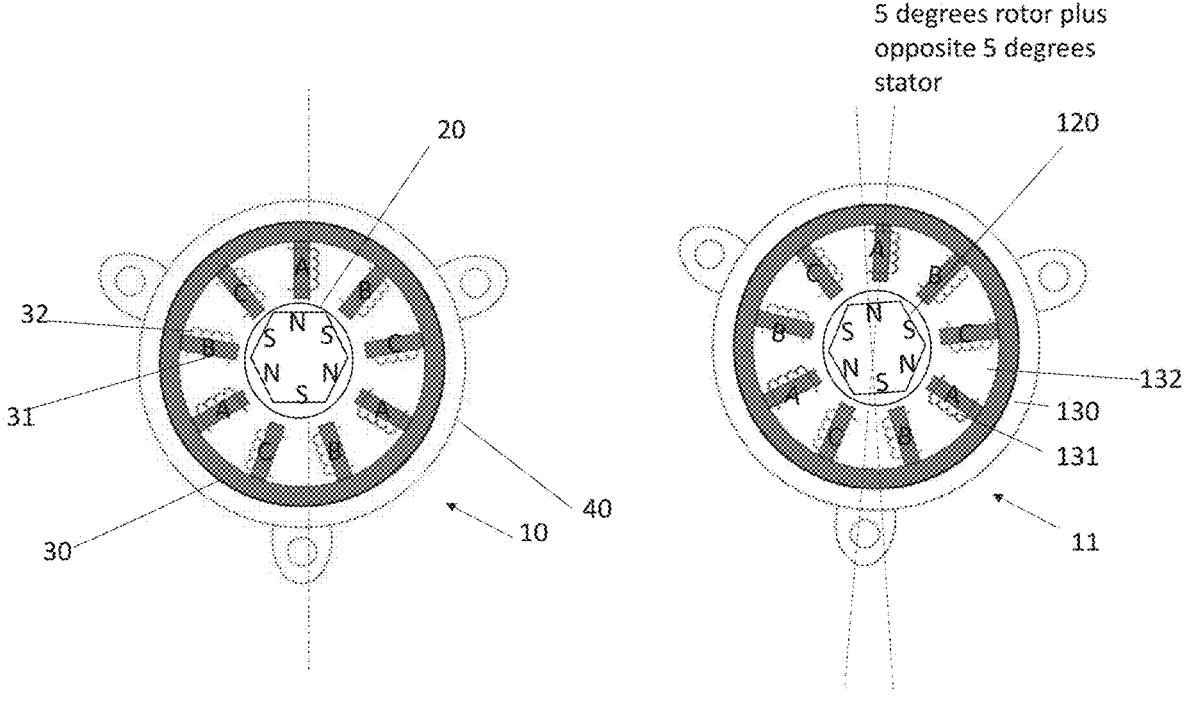
FIG. 5 is a cross section view of another arrangement of each of the two motors of the apparatus of FIG. 1 illustrating the location of the magnets, the stator teeth, and the electrical connections of the phase windings there is a 10 degrees relative phasing between the motors due to offset of both the rotors and the two stators.

The axes of the output shafts 8, 9 of the two motors 10, 11 are arranged perpendicularly to the rotational axis of the shaft 3 and, as best seen in FIGS. 2 and 4, the axes of the two motors may also be inclined with respect to each other, to reduce the overall size of the assembly. As best seen in FIG. 1, the motors 10, 11 are received in a transversely extending two-part extension of the housing 2.

The motors 10, 11 are controlled by an electronic control unit (ECU) so that at low levels of input torque applied to the shaft 3 by the steering wheel, they act in opposite directions on the gear wheel 4 to eliminate backlash. At higher levels of input torque applied to the shaft 3 by the steering wheel, the motors 10, 11 act in the same direction on the new wheel to assist in rotation of the shaft 3.

The use of two separate motors 10, 11 which can be controlled in a first operational mode to apply torque in opposite directions to the gear 4 eliminates the need to control backlash with precision components. In addition, the use of two separate motors 10, 11 which can be controlled in a second operational mode to apply torque in the same direction to the gear 4 allows the motors and gear components to be specified at half the rating of the required total system torque, thereby reducing the size and cost of the assembly.

As will also become apparent the use of the two motors when appropriately aligned can help to reduce unwanted torque ripple and cogging torque considerably below levels that can be achieved using a single motor of the same design and below that of a dual motor assembly in which a conventional motor alignment is used.

The arrangement of the two motors 10, 11, the shaft 3, the worm gears 6, 7 and the wheel gear 4 together form a dual motor electrical assembly.

As shown in FIGS. 3, 4, 5 and 7, the first motor 10 includes a first rotor 20, a first stator 30 and a first output shaft 8 rotatably coupled to the first rotor 20 at a first end of the first output shaft 8. The first motor 10 further includes a first case shown in which at least partially covers the first rotor 20 and the first stator 30. The first case 40 is secured to a housing which is rigidly mounted to, or integral with the elongated metal housing 2.

The motor has nine stator teeth 31 in this example, and the rotor carries six permanent magnets. Each magnet is labelled N for a north pole and S for a South pole and the North and South poles alternate around the rotor. Each stator tooth 31 is wound with electrical conductor 32 such that a current flowing through the windings around a tooth will induce a magnetic field in the teeth. The coils 32 are connected to form three motor phases, labelled A, B and C in the figures. The motor 10 is driven by an inverter which applies current waveforms to each of the three phases of the motor in a known manner. When these drive currents are applied to the phase's electromagnetic interaction between the magnetic field generated at the stator 30 and the field of the rotor permanent magnets can be used to cause the rotor 20 to rotate and for the motor 10 to generate a torque. This is applied via the Wormshaft 6 onto the gearwheel 4 and in turn the shaft 3.

Similarly, the second motor 11 includes a second rotor 120, a second stator 130 and a second output shaft 9 rotatably coupled to the second rotor 120 at a first end. The second motor 11 further includes a case as shown in FIG. 1. This case is also secured to the gearbox housing 12 which is rigidly mounted to, or integral with the elongated metal housing 2.

The second motor 11 has an identical rotor 120, stator 130 and coils to the first motor. The second motor 11 has nine stator teeth 131 in this example, and the rotor carries six permanent magnets. Each magnet is labelled N for a north pole and S for a South pole and the North and South poles alternate around the rotor. Each stator tooth 131 is wound with electrical conductor 132 such that a current flowing through the windings around a tooth will induce a magnetic field in the teeth. The coils are connected to form three motor phases, labelled A, B and C in the figures. The second motor is driven by a second inverter which applies current waveforms to each of the three phases of the motor in a known manner. When these drive currents are applied to the phase's electromagnetic interaction between the second rotor 120 and the magnetic field generated at the second stator 130 can be used to cause the rotor to rotate and for the motor to generate a torque. This is applied via the Wormshaft 7 onto the gearwheel 4 and in turn the shaft 3.

Figure 7:
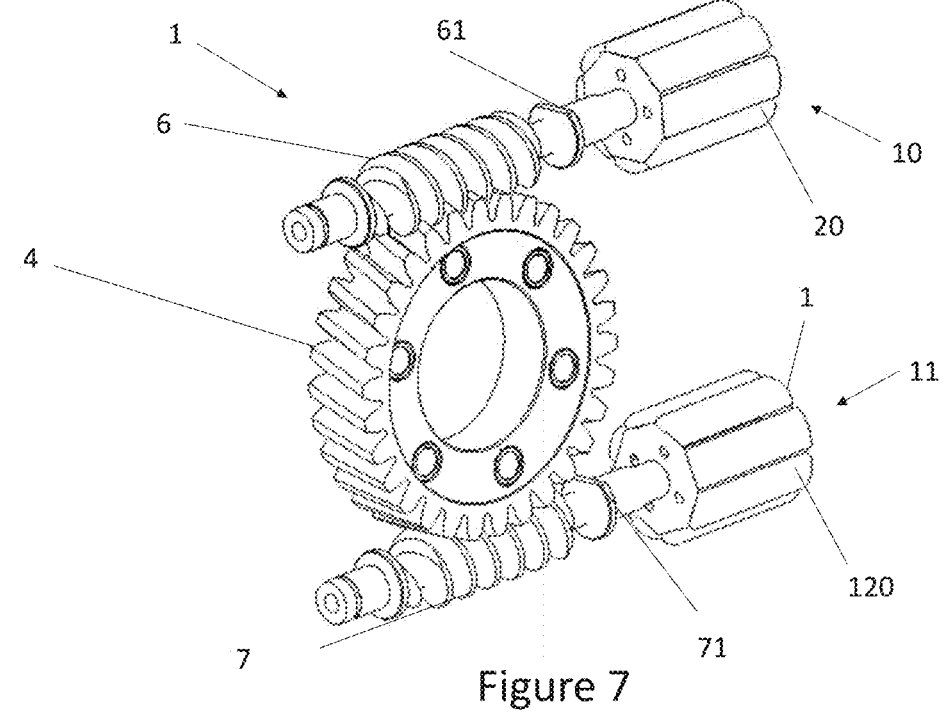
FIG. 7 is a view corresponding to FIG. 2 with the motor casing and stator removed to show the phase offset between the two motor rotors when arranged as shown in FIG. 4 with offsetting of the motor rotors.
Figure 8:
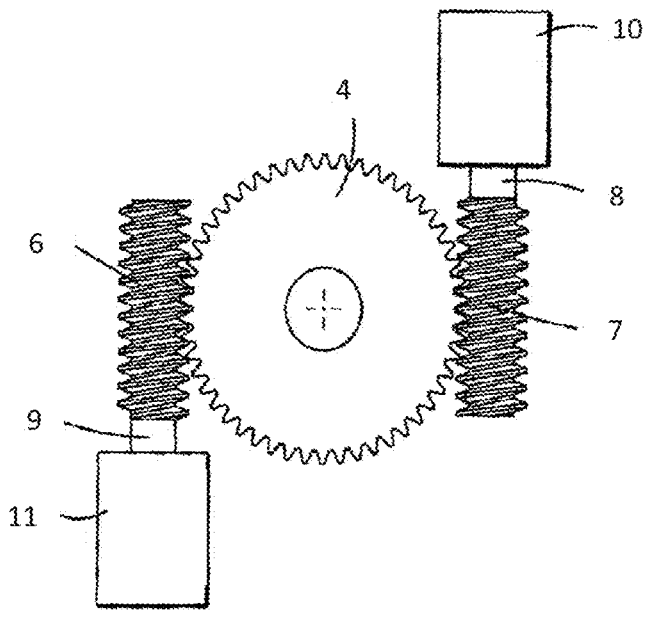
FIG. 8 shows another arrangement of the Wormshaft whereby the two motors can be driven in the same direction to control the position of the shaft unlike the arrangement of FIG. 2 in which the motors are operated in opposing directions.

The first motor 10 and the second motor 11 may be located on diametrically opposite sides of the worm wheel 30 as shown in FIG. 1. Other positions may be used but placing them on opposing sides does provide a compact arrangement and make for convenient connections of the motor phases to the drive circuitry. Another arrangement is shown in FIG. 7 in which the two motors 10, 11 are arranged so that that are facing each other but offset to either side of the shaft 3.

Figure 3:
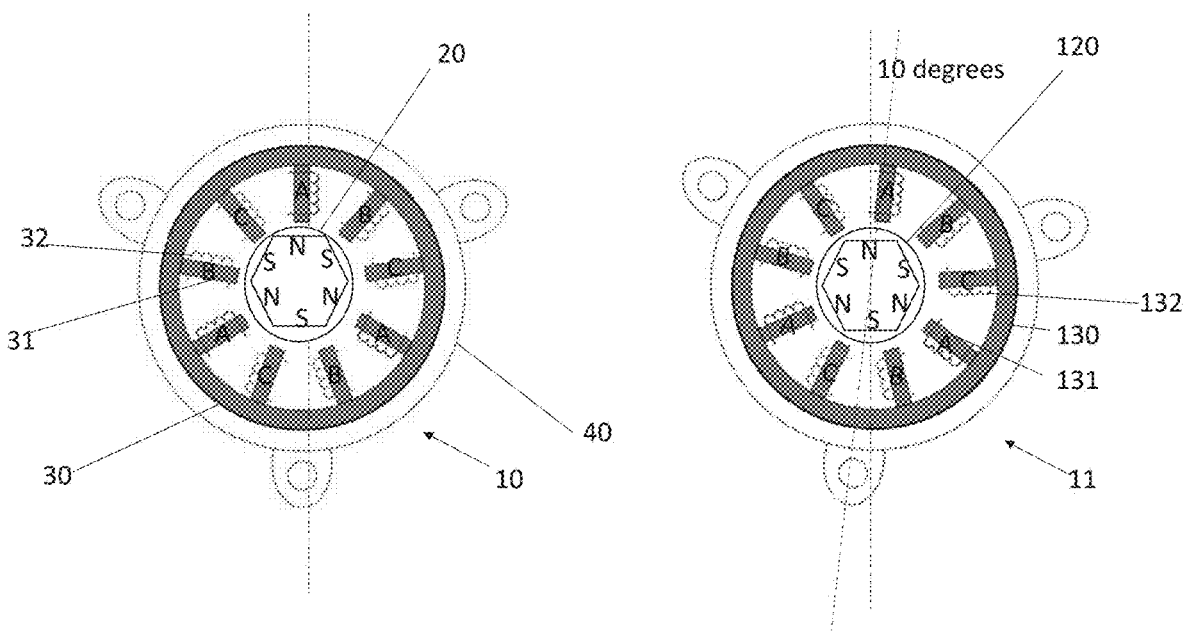
FIG. 3 is a cross section view of each of the two motors of the apparatus of FIG. 1 illustrating the location of the magnets, the stator teeth, and the electrical connections of the phase windings there is a 10 degrees relative phasing between the motors due to offset of the two stators.

The stators of the two motors 10, 11 in this example may be aligned so that they are in phase with each other but in this exemplary arrangement they are aligned as shown in FIG. 3 with a phase difference between the two. By phase difference we mean that the identical patterns of cogging torque from the two motors as the shaft 3 rotates are offset. This is achieved in the arrangement of FIG. 3 by careful selection of the angular position of the stators of the two motors 10, 11 relative to the gearbox housing 12. When each motor is placed into the gearbox housing, care is also taken to ensure that the two rotors are perfectly aligned, with no phase difference between them, for example by reference to a mechanical feature on the wormscrew. This means that for any given position of the shaft 3 the motor mechanical positions of the two motors will be offset by an amount determined by the mechanical phase difference between the two motor stators.

Figure 6:
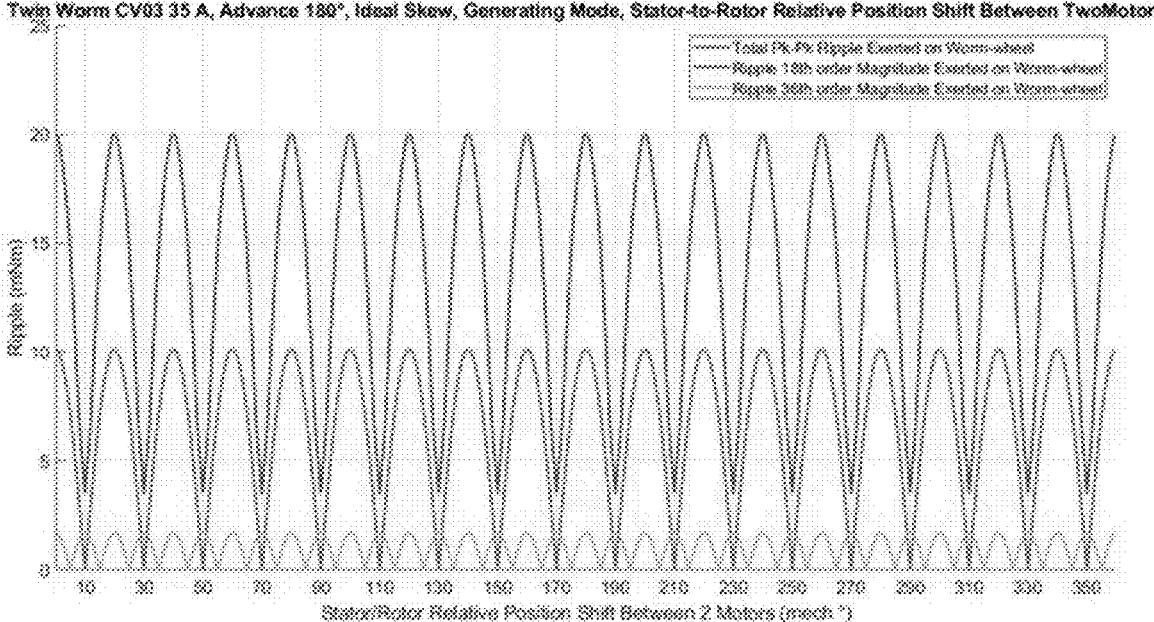
FIG. 6 shows the ripple torque at the shaft when the motors are acting as generators for every possible phase difference between the alignment of the motors.

In this exemplary arrangement the two stators 20, 120 are aligned so that there is a 10-degree phase offset between them. The applicant has appreciated that the phase offset has a significant effect on the overall cogging torque that is present at the shaft 3 because of the additive effect of the cogging torques and ripple torques from the two motors acting on the gear wheel 4. FIG. 6 shows how torque ripple measured at the shaft 3 varies with the offset of the motor stators between 0 and 360 degrees. 0 degrees is the conventional alignment of two motors in a dual motor handwheel actuator since it allows for identical control of the two motors and simplifies the placing and alignment of the connectors of the motor phases to the control circuitry. It can be seen that the provision of a 10 degrees offset has considerably reduced the overall torque ripple at the shaft 3, with the corresponding cogging torque following a similar waveform.

Figure 9:
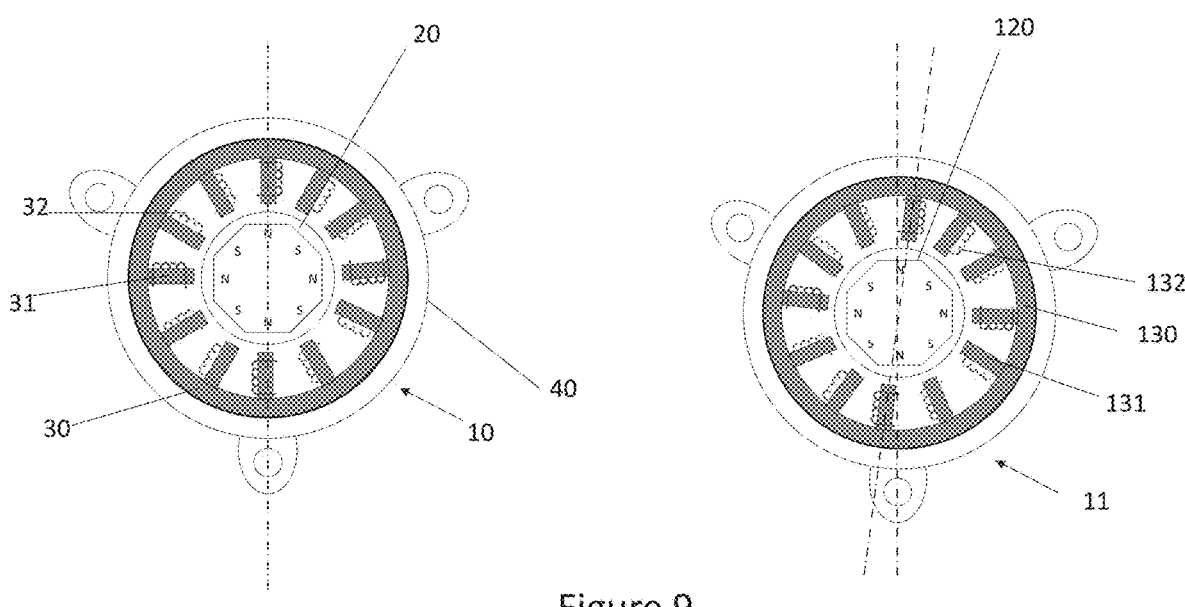
FIG. 9 is a cross section view of each of two motors of the apparatus of FIG. 1 illustrating the location of the magnets, the stator teeth, and the electrical connections of the phase windings, here the each of the motors are 12:8 motors and there is a 7.5 degrees relative phasing between the motors due to offset of the two stators.

FIG. 9 shows another exemplary arrangement wherein the two motors 10, 11 are both 12:8 motors (the rotor comprises 8 permanent magnets while the stator comprises 12 slots). This figure illustrates the location of the permanent magnets, the stator teeth 31, 131 and the electrical connections of the phase windings 32, 132. There is a 7.5 degrees relative phasing difference between the two motors 10, 11 due to offset of the two stators 30, 130.

Figure 10:
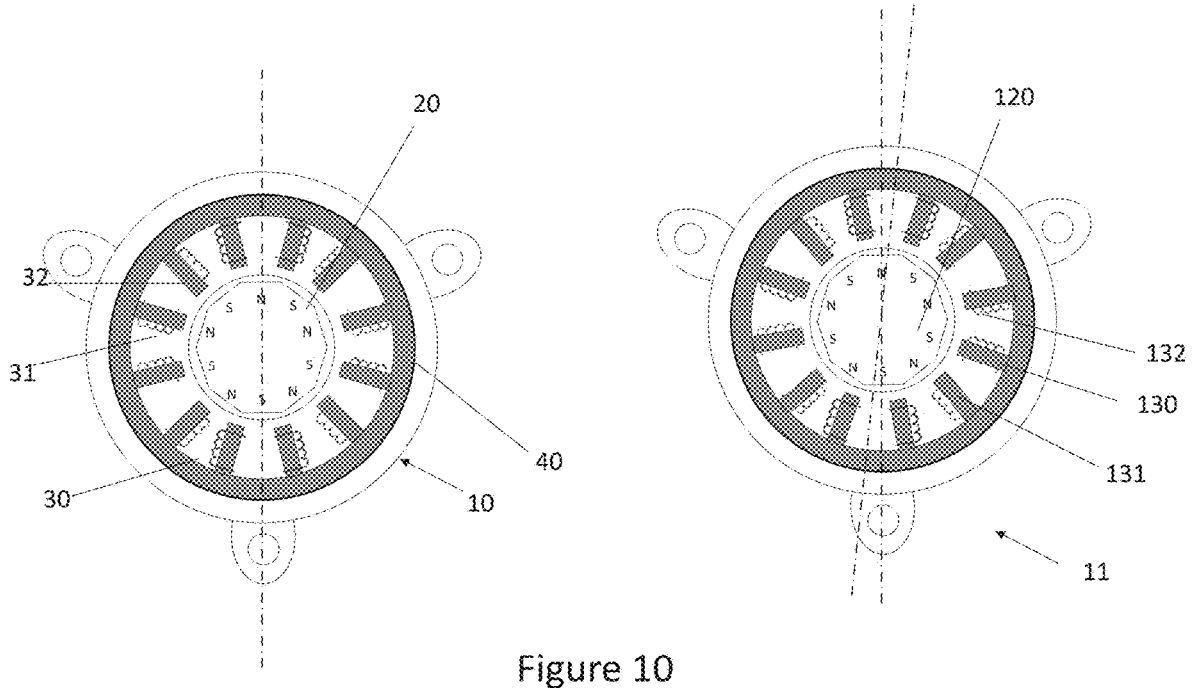
FIG. 10 is a cross section view of each of two further motors of the apparatus of FIG. 1 illustrating the location of the magnets, the stator teeth, and the electrical connections of the phase windings, here the each of the motors are 12:10 motors and there is a 3 degrees relative phasing between the motors due to offset of the two stators.

FIG. 10 shows another exemplary arrangement wherein the two motors 10, 11 are both 12:10 motors (the rotor comprises 10 permanent magnets while the stator comprises 12 slots). This figure illustrates the location of the permanent magnets, the stator teeth 31, 131 and the electrical connections of the phase windings 32, 132. There is a 3 degrees relative phasing difference between the two motors 10, 11 due to offset of the two stators 30, 130.

By phase difference we mean that the identical patterns of cogging torque from the two motors 10, 11 as the shaft 3 rotates are offset. This is achieved in the arrangements of FIGS. 9 and 10 by careful selection of the angular position of the stators of the two motors 10, 11 relative to the gearbox housing 12. When each motor is placed into the gearbox housing, care is also taken to ensure that the two rotors are perfectly aligned, with no phase difference between them. This means that for any given position of the shaft 3 the motor mechanical positions of the two motors will be offset by an amount determined by the mechanical phase difference between the two motor stators.

The disclosure is not restricted to the details of the foregoing exemplary arrangement. The motors may have different topologies and in each case a different motor relative phasing may be used to optimise the reduction of cogging torque or of torque ripple.

In another exemplary arrangement shown in FIG. 4 the stators are not offset but the rotors have instead been offset by the 10 degrees. In a further exemplary arrangement shown in FIG. 5 both the stator and the rotors have been offset to give a total combined offset between the motors of 10 degrees.

The invention claimed is:

1. A dual motor drive assembly comprises a housing, a shaft rotatably mounted with respect to the housing, a first gear connected to and configured to rotate with the shaft, and first and second motors, each having an output driving a respective output gear, the output gears being engaged with the first gear, in which each motor comprises a permanent magnet motor that has the same number of poles and stators such that each motor produces the same pattern of cogging torque over a complete mechanical revolution of the motor, and such that the relative phasing of the first motor relative to that of the second motor is fixed whereby the effect of cogging torque applied to the shaft by the first motor is at least partially cancelled by the effect of cogging torque applied to the shaft by the second motor when the shaft is rotated, the relative phase offset between the motors is set as a function of the following motor parameters:

number of rotor poles;
  number of cycles of a certain waveform per one mechanical rotation;
  the motor skew angle; and
  where the motor is step skewed, the skew angle per step of the magnets.

2. A dual motor drive assembly according to claim 1 which includes a common housing for both of the motors and the relative phasing of the two motors is set at least in part by fixing the stators of the two motors into the housing at different angular orientations.

3. A dual motor drive assembly according to claim 2 in which the stators are fixed to the first gear through the respective output gears shafts such that they are always in phase with each other.

4. A dual motor drive assembly according to claim 1 which includes a common housing for both of the motors and in which the stators are fixed to the first gear through the respective output gears shafts such that they are always out of phase with each other by a set amount that is determined by the required relative phasing of the motors.

5. A dual motor drive assembly according to claim 1 in which the rotor and the stator of each of the two motors are identical.

6. A dual motor drive assembly according claim 1 including a part of a handwheel actuator assembly for a vehicle, where the shaft includes a fixing part whereby it can be fixed to a steering wheel or yoke.

7. A dual motor drive assembly according to claim 1 in which both motors comprise permanent magnet motors in which the rotor has six permanent magnets and the stator has nine coil windings and the relative phasing between the two motors is 10 degrees mechanical plus M*20 degrees mechanical where M is zero or a positive integer value.

8. A dual motor drive assembly according to claim 1 in which both motors comprise permanent magnet motors in which the rotor has eight permanent magnets and the stator has 12 coil windings and the relative phasing between the two motors is 7.5 degrees mechanical plus M*15 degrees mechanical where M is zero or a positive integer value.

9. A dual motor drive assembly according to claim 1 in which both motors comprise permanent magnet motors in which the rotor has ten permanent magnets and the stator has twelve coil windings and the relative phasing between the two motors is 3 degrees mechanical plus M*6 degrees mechanical where M is zero or a positive integer value.

10. A dual motor drive assembly according to claim 1 in which the phase offset between the motors is set to optimise the cancellation of a particular harmonic.

11. A dual motor drive assembly according to claim 1 in which the first gear comprises a worm gear and each of the output gears comprises a worm screw.

12. A dual motor drive assembly according to claim 11 in which the rotational axes of the two worm screws are inclined with respect to each other, and the rotational axes of the two worm screws extend perpendicularly to the rotational axes of the first gear.

13. A dual motor drive assembly according to claim 11 in which the output gears are also substantially identical so that the torque multiplication from the motors to the shaft are the same.

14. A dual motor drive assembly comprises a housing, a shaft rotatably mounted with respect to the housing, a first gear connected to and configured to rotate with the shaft, and first and second motors, each having an output driving a respective output gear, the output gears being engaged with the first gear, in which each motor comprises a permanent magnet motor that has the same number of poles and stators such that each motor produces the same pattern of cogging torque over a complete mechanical revolution of the motor, and such that the relative phasing of the first motor relative to that of the second motor is fixed whereby the effect of cogging torque applied to the shaft by the first motor is at least partially cancelled by the effect of cogging torque applied to the shaft by the second motor when the shaft is rotated in which both motors comprise permanent magnet motors in which the rotor has six permanent magnets and the stator has nine coil windings and the relative phasing between the two motors is 10 degrees mechanical plus M*20 degrees mechanical where M is zero or a positive integer value.

15. A dual motor drive assembly comprises a housing, a shaft rotatably mounted with respect to the housing, a first gear connected to and configured to rotate with the shaft, and first and second motors, each having an output driving a respective output gear, the output gears being engaged with the first gear, in which each motor comprises a permanent magnet motor that has the same number of poles and stators such that each motor produces the same pattern of cogging torque over a complete mechanical revolution of the motor, and such that the relative phasing of the first motor relative to that of the second motor is fixed whereby the effect of cogging torque applied to the shaft by the first motor is at least partially cancelled by the effect of cogging torque applied to the shaft by the second motor when the shaft is rotated in which both motors comprise permanent magnet motors in which the rotor has eight permanent magnets and the stator has 12 coil windings and the relative phasing between the two motors is 7.5 degrees mechanical plus M*15 degrees mechanical where M is zero or a positive integer value.

* * * * *